United States Patent [19]

Linden et al.

[11] 4,071,487
[45] Jan. 31, 1978

[54] ANTI-SETTLING AGENTS FOR PIGMENTED AQUEOUS LACQUER AND PROCESS FOR THE MANUFACTURE OF SAID AGENTS

[75] Inventors: Heinz Linden, Dusseldorf-Holthausen; Wolfgang Gress, Wuppertal-Elberfeld; Wilhelm Offermann, Dusseldorf, all of Germany

[73] Assignee: Henkel KGaA, Dusseldorf, Germany

[21] Appl. No.: 651,476

[22] Filed: Jan. 22, 1976

[30] Foreign Application Priority Data

Jan. 27, 1975 Germany .............................. 2503166

[51] Int. Cl.² .......................... C09D 3/64; C09D 5/02; C09D 7/02
[52] U.S. Cl. .............................. 260/22 TN; 106/308 N; 106/308 F; 260/22 A; 260/29.2 E; 260/29.6 R; 260/29.6 MN; 260/32.6 R; 560/155
[58] Field of Search ............ 260/485 N, 22 TN, 22 A, 260/29.2 E, 32.6 R, 29.6 MN; 106/308 Q, 308 F, 308 M, 308 N

[56] References Cited

U.S. PATENT DOCUMENTS

| | | | |
|---|---|---|---|
| 2,251,765 | 8/1941 | Sorenson | 260/485 N |
| 2,610,205 | 9/1952 | Trigg et al. | 260/485 N |
| 2,889,356 | 6/1959 | Bennett et al. | 260/485 N |
| 2,959,553 | 11/1960 | Rowlands et al. | 260/485 N |
| 3,433,753 | 3/1969 | Farkas et al. | 260/22 A |
| 3,752,778 | 8/1973 | Dhein et al. | 260/22 TN |
| 3,775,148 | 11/1973 | Bradley | 106/308 Q |

FOREIGN PATENT DOCUMENTS

| | | | |
|---|---|---|---|
| 787,808 | 6/1968 | Canada | 106/308 Q |

*Primary Examiner*—Ronald W. Griffin
*Attorney, Agent, or Firm*—Hammond & Littell

[57] ABSTRACT

Water-dispersible (including water-soluble) salts of water-soluble amines with the anionic products formed by reacting at 200° C. to 250° C. a substantially neutral ester of a $C_{14-20}$ saturated fatty alcohol with an ethylenedicarboxylic acid which has been reacted with about 1/7 to 1/35 of its weight of a ethylenedicarboxylic compound of acidic character (for example maleic acid) are efficient agents for inhibiting the deposition of pigment in pigmented aqueous lacquers. Organic solutions of the salts are storage-stable. The salts can be incorporated into the lacquer during formulation of the lacquer or at a later point.

23 Claims, No Drawings

ANTI-SETTLING AGENTS FOR PIGMENTED AQUEOUS LACQUER AND PROCESS FOR THE MANUFACTURE OF SAID AGENTS

FIELD OF INVENTION

The present invention relates to amine salts of modified esters of reaction products of unsaturated fatty alcohols with ethylene-dicarboxylic acids, useful as suspension or anti-settling agents for aqueous lacquer systems. The invention includes the amine salts themselves; aqueous and organic solutions of the salts; methods for the manufacture of the salts and solutions of these salts; lacquers containing these salts; and the manufacture of the lacquers.

Aqueous lacquer systems are suspensions of pigments and optionally fillers in solutions of binding agents, which contain as solvent for the binding agent water or a mixture of water and organic solvent. The binders used are alkyd-, melamine-, epoxyester-, vinyl- and phenol resins and usually contain free hydroxyl and carboxyl groups. These resins become water-soluble by neutralization of the carboxyl groups. In water-containing lacquer systems these resins are used in the form of their ammonium or amine salts. Application may be effected by spreading, brushing, spraying, dipping or electrolytic deposition, and during the drying process ammonia or amine volatilizes, as a result of which the binding agents lose their solubility in water. Cross-linking of the resins which have become water-insoluble may be effected by air oxidation or by reaction with other resin components present in the system, or by thermosetting. These resins are frequently designated the "film-forming component" of the lacquers since this is often their primary function.

The pigments used in lacquer systems such as heavy spar, red lead, red iron oxide and micaceous iron ore among others, have, as a rule, a higher specific gravity than the binder solutions in which they are suspended. This leads to two detrimental results. The first is that the pigments settle sufficiently fast that the lacquers are not storage stable. The second is that the pigment, when it settles, accumulates and forms a hard deposit at the bottom which is difficult or impossible to disperse; the latter phenomenon is generally termed "hard settling" and renders the lacquer useless.

For lacquer systems which contain only organic solvents a number of agents are known which prevent or hinder the deposition of the pigments and formation of hard deposits. These agents are primarily surface-active substances which, with appropriate processing, are adsorbed by the pigment particles as very thin layers, and even in relatively small amount they are capable of holding the suspended particles in suspension or at least largely preventing the formation of hard, no longer stirrable deposits. Thus metal or amine salts of fatty-, resin- and naphthenic acids have been used as suspension or anti-settling agents for organophilic lacquer systems. More recently a change was made to salts of surface-active sulfuric acid derivatives, whereby the salts of pure sulfonic acids gained less significance in practice than those of stable sulfuric acid half esters. Further, amine salts of dimeric fatty acids and soya lecithin have been proposed as anti-settling agents. Inorganic products, such as finely divided silicic acid, montmorillonite and bentonites which have been made organophilic with quaternary ammonium compounds are also used to prevent the settling of the pigments in organophilic lacquer systems. All these compounds possess insufficient activity for practical purposes when they are used in aqueous lacquer systems.

Amine salts of acidic phosphoric acid esters have already been proposed as anti-settling agents for pigmented water-based lacquers, but it has been found that these compounds prevent pigment settling in aqueous lacquer systems to an insufficient extent.

OBJECTS OF THE INVENTION

An object of the present invention is to provide a new group of water-dispersible (including water-soluble) agents which will inhibit the rate of deposition (i.e., the settling) of pigments from pigmented aqueous lacquers, and thereby to provide new pigmented aqueous lacquer system of improved storage stability.

A further object of the invention is to provide a simple, rapid and economical method for the manufacture of said agents, and for the manufacture of pigmented aqueous lacquers containing said agents.

BRIEF SUMMARY OF THE INVENTION

It has now been found that amine salts of reaction products of unsaturated fatty alcohols having 14 to 20 carbon atoms with ethylenedicarboxylic acids of the formula:

of their anhydrides of the formula:

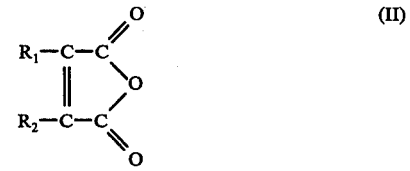

in which $R_1$ and $R_2$ represent hydrogen or methyl, in the preparation of which a fatty alcohol and an ethylene dicarboxylic acid or ethylene dicarboxylic acid anhydride are reacted at 120° C. to 200° C. to produce the diester, the neutral ester thus obtained is heated for 1 to 25 hours with further dicarboxylic acid or further dicarboxylic acid anhydride at 200° C. to 250° C. in the weight ratio of 7:1 to 35:1, and the product is converted into the amine salt, are very effective as antisettling agents for aqueous lacquer systems. The composition of the product has not been ascertained, and therefore the product is defined in process terms.

Usually the fatty alcohol and dicarboxylic acid or dicarboxylic acid anhydride are reacted in a molar ratio of substantially 2:1 to produce the neutral diester.

Therefore the present invention is based on the discovery that the water-dispersible salts of water-soluble amines with the reaction products of a substantially neutral ester of a $C_{14-20}$ unsaturated fatty alcohol with an α, β-unsaturated ethylenedicarboxylic acid which has been reacted with about 1/7 to 1/35 of their weight of an α, β-unsaturated ethylenedicarboxylic compound of acidic character, said reaction product being formed by heating said ethylenedicarboxylate ester and said ethylenedicarboxylic compound at 200° C. to 250° C. for about 1 to 25 hours, are effective agents for inhibiting the deposition of pigments in pigmented aqueous lacquers. The ethylenedicarboxylic compound which is used to form the ester, and the ethylenedicarboxylic compound with which the ester is reacted, each contain not more than six carbon atoms.

The invention thus provides a pigmented aqueous lacquer of improved storage properties resulting from the presence therein of an effective amount of an amine salt of the type described above as agent inhibiting deposition and hard settling of the pigment.

We have further found that these agents can be readily prepared by heating a neutral ester of a $C_{14-20}$ unsaturated fatty alcohol with an $\alpha, \beta$-unsaturated ethylenedicarboxylic acid with a $\alpha, \beta$-unsaturated ethylenedicarboxylic compound of acidic character at 200° C. to 250° C. until said ester has reacted with between about 1/7 and about 1/35 of its weight of said compound, and neutralizing the product of said reaction with at least a sufficient amount of a water-soluble amine to form a water-dispersible salt. The neutralization step is preferably performed with the reagents in solution in an organic medium containing less than 5% water by weight.

We have still further found that these agents can be incorporated in the lacquer at any point in its manufacture from the point where the components are milled together to the point where the lacquer receives its final pH adjustment.

DETAILED DESCRIPTION

Mono- and poly-unsaturated fatty alcohols having 14 to 20 carbon atoms are used as starting material for the preparation of the reaction products from unsaturated alcohols and ethylenedicarboxylic acids or ethylenedicarboxylic acid anhydrides. Such unsaturated alcohols can be prepared commercially from animal and vegetable fats or from esters of these alcohols with monohydric alcohols by reduction with sodium and alcohol or by catalytic hydrogenation. Chemically pure compounds are not obtained by these processes. The term "commercially unsaturated alcohols" on the contrary represents mixtures of mono- and poly-unsaturated alcohols of various chain lengths, which in most cases contain a more or less large proportion of saturated compounds, while the composition depends to a great extent on the source of the starting fatty acids. Commercial oleyl alcohol and the commercial soya alcohols and linseed oil alcohols obtainable from the fatty acids of soya bean oil and linseed oil are specially suitable for the preparation of the amine salts to be used according to the present invention.

Maleic acid, fumaric acid, citraconic acid, mesaconic acid and dimethylfumaric acid are $\alpha, \beta$-unsaturated acids and are examples of suitable esterifiable ethylenedicarboxylic acids of formula (I), and the anhydrides of citraconic acid, methylmaleic acid and dimethylmaleic acid and also preferably maleic anhydride are examples of ethylenedicarboxylic acid anhydrides of formula (II). These compounds contain the grouping —CO—C=C— and consequently are generally described as ethylenedicarboxylic compounds of acidic character containing not more than six carbon atoms.

Tertiary amines such as trimethylamine, triethylamine, tripropylamine, triisopropylamine, dimethylethanolamine, ethyldiethanolamine and triethanolamine are particularly suitable for the formation of salts with the reaction products from unsaturated fatty alcohols and ethylenedicarboxylic acids or ethylenedicarboxylic acid anhydrides. In general any mono- or polyamine is suitable so long as it is water-soluble, i.e., so long as it is soluble in water at room temperature to the extent of at least 10% by weight.

In the preparation of the amine salts to be used according to the present invention the unsaturated fatty alcohols are first reacted with the respective ethylenedicarboxylic acids or their anhydrides, usually in about 2:1 molar ratio, to give the corresponding neutral esters. Esterification proceeds at temperatures from 120° C. to 200° C. and the water formed is continuously removed from the reaction mixture. In the simplest case the water from the reaction is distilled over a downward sloping condenser. The water formed, however, can also be removed from the reaction mixture by azeotropic distillation with a suitable solvent such as, for example xylene, with the use of a reflux condenser with interposition of a water separator. The esterification is finished when the theoretical amount of water has passed over. Thereafter any solvent present is distilled off.

The neutral ester obtained in this way is then heated at 200° C. to 250° C. with further amount of the desired ethylenedicarboxylic acid or anhydride (or mixtures thereof). In this case the proportion by weight of the neutral ester: dicarboxylic acid or dicarboxylic acid anhydride lies in the region of 7:1 to 35:1, so that the fatty acid ester is reacted with 1/7 to 1/35 of its weight of the additional acid. The time of heating is between about 1 to 25 hours and is at least sufficiently long so that the ester reacts with the minimum amount of added acid shown above.

The reaction products are anionic. For conversion into amine salts, the reaction products obtained are dissolved in solvents such as white spirit, toluene or xylene. After addition of water and at least the amount of amine required for formation of the salt, the mixture, with stirring as necessary, is heated for 10 minutes to two hours at 60° C. to 100° C. When solvents miscible with water such as lower alcohols, cyclohexanol, glycol ethers or glycol ether acetates are added to the reaction mixture, solutions of amine salts are obtained which are stable on storage and which may be incorporated in the aqueous lacquer system without further processing.

The amounts of amine salt prepared as described above which is necessary for the attainment of good inhibition of hard settling are small and lie between 0.05% to 5% (preferably 0.1% to 3%, dry basis) of the weight of the finished water-lacquer composition, depending on the nature and condition of the pigment and depending on the kind and viscosity of the binder. A suitable amount in any instance is readily found by trial.

The amine salts to be used according to the present invention are preferably incorporated into the aqueous lacquer system in the form of their concentrated dispersions or solutions in the above-described mixtures of water and organic solvents. The amine salt solutions can be added to the pigment pastes during the preparation of the water lacquer before these pastes are ground with the water-containing or water-dilutable binders. However, it is also possible, to stir the amine salt solutions into the finished lacquers both before and after the lacquers have been thinned or after their viscosity has been adjusted.

The following examples are presented to illustrate further the present invention and should not be construed in limitation thereof.

PREPARATION OF AMINE SALTS

For the preparation of amine salts of reaction products from unsaturated fatty alcohols and α,β-unsaturated dicarboxylic acids to be used according to the present invention, fatty alcohol mixtures A, B and C were used, the compositions and characteristics of which are given below in Table I. These fatty alcohol mixtures can be obtained by partial hydrogenation of methyl esters of soya oil fatty acids (A), of commercial oleic acid (B) and of linseed oil fatty acids (C).

TABLE I

| % By Weight | Fatty Acid Mixtures | | |
|---|---|---|---|
| | A | B | C |
| $<C_{16}$ saturated | 0.4 | 0.3 | — |
| $C_{16}$ saturated | 10.6 | 1.9 | 7.4 |
| $C_{18}$ saturated | 5.9 | 1.7 | 8.9 |
| $>C_{18}$ saturated | 6.4 | 0.5 | 0.3 |
| $C_{16}$ mono-unsaturated | — | 0.6 | — |
| $C_{18}$ mono-unsaturated | 29.4 | 92.7 | 35.1 |
| $C_{18}$ di-unsaturated | 44.5 | 2.1 | 21.8 |
| $C_{18}$ tri-unsaturated | 2.8 | 0.2 | 26.5 |
| Acid value | 0 | 0.7 | 0.1 |
| Saponification value | 0.1 | 6.4 | 0.4 |
| Hydroxyl value | 214 | 201 | 216 |
| Iodine value (according to Wijs) | 134.6 | 93.4 | 167 |
| Molecular weight according to hydroxy value | 262 | 279 | 260 |

5.7% by weight of fatty alcohol mixture A and 4.3% by weight of fatty alcohol mixture B had conjugated double bonds. In mixture C no fatty alcohols with conjugated double bonds were present.

For the detection of free maleic anhydride in the reaction products from maleic anhydride with unsaturated fatty alcohols described below, the color reaction of dimethylaniline with maleic anhydride described in Ber. 51 (1918), p. 1820 was used. The carboxylic acid anhydride groups present in the reaction products were determined by means of the "Anilineacid value" described in Anal. Chim. Acta 2 (1948), p. 146–148.

For testing as an anti-settling agent in water-containing lacquer systems, the following amine salts were prepared from reaction products of unsaturated fatty alcohols with maleic anhydride.

AMINE SALT I 262 g. (1 mol) of the commercial fatty alcohol mixture A, 49 g. (0.5 mol) of maleic anhydride and 80 g. of xylene were stirred at 160° C. to 200° C. for 7 hours. In this time 8.5 g. of water (94.5% of theory) was removed from the reaction mixture by means of a water separator. Then the xylene was distilled off in a water jet vacuum.

95 g. (0.16 mol) of the above-described substantially neutral fatty alcohol-maleic acid ester (acid value <5) was heated with 5 g. (0.05 mol) of maleic anhydride to 220° C. and maintained at this temperature for six hours. After this no maleic anhydride was present in the light yellow, clear reaction product. The product had an aniline acid value of 35. Its viscosity at 20° C. was 300 poises.

For the preparation of the triethylamine salt 50 g. of the above reaction product were stirred with 21 g. of white spirit (b.p. 180° C. to 210° C.), 21 g. of ethylene glycol monobutyl ether, 2 g. of water and 6 g. of triethylamine at 80° C. for one hour. A yellow clear solution was formed.

AMINE SALT II 279 g. (1 mol) of commercial fatty alcohol mixture B and 49 g. (0.5 mol) of maleic anhydride were maintained at a temperature of 160° C. to 200° C. for six hours. The water formed in the reaction was continuously distilled off from the reaction mixture by way of a downward sloping condenser. A total of 8.5 g. of water passed over.

90 g. (0.14 mol) of the neutral fatty alcohol-maleic acid ester thus obtained (acid value 8.2) were heated to 240° C. with 10 g. (0.1 mol) of maleic anhydride and kept at this temperature for eight hours. Maleic anhydride could no longer be detected in the light brown reaction product. The aniline acid value was 57; the viscosity at 20° C. was 150 poises.

For the preparation of the triethylamine salt 50 g. of the reaction product, 18 g. of white spirit, 4.8 g. of water, 10.7 g. of triethylamine and 16.5 g. of ethylene glycol monobutyl ether were heated under reflux for one hour. A sample of the product thus obtained, after dilution with water in the ratio 1:9, had a pH value of 10.9.

AMINE SALT III 2600 g. (10 mol) of commercial fatty alcohol mixture C, 490 g. (5 mol) of maleic anhydride and 500 g. of toluene were heated to 160° C. with stirring and the mixture was maintained at this temperature for 20 hours. In this period 87 ml. of water was removed from the reaction mixture by means of a water separator. Then the toluene was distilled off under the vacuum provided by a water jet pump.

970 g. (1.62 mol) of the neutral maleic acid ester thus obtained (acid value 15) was heated to 200° C. with 30 g. (0.31 mol) of maleic anhydride and the mixture was maintained at this temperature for four hours. The reaction product thus obtained had a light color and had an aniline acid value of 32.5. Its viscosity at 20° C. was 109 poises.

For the preparation of the triethylamine salt, 500 g. of the reaction product were stirred with 210 g. of white spirit (commercially available under the name "Kristallol 60"), 210 g. of ethylene glycol monobutyl ether, 20 g. of water and 60 g. of triethylamine at 80° C. for one hour. A light-colored solution was obtained. A sample after dilution with water in the ratio 1:9, had a pH value of 10.6.

EXAMPLE 1

Eight samples of a water-soluble primer for protection against rust of the following composition were prepared. Each sample was prepared as follows:

Component 1

330 g. Isocyanate-modified, neutralizable alkyd resin with about 49% by weight of drying fatty acids; 63% by weight solution in ethylene glycol monobutyl ether (commercially obtainable under the name "Alkydal F 50 W" from Bayer A.G.).
20 g. Triethylamine.
3 g. Calcium octoate (4% Ca by weight)
137 g. Titanium dioxide (rutile)
80 g. Soot.
45 g. Strontium carbonate.
80 g. Dolomite, micronized.
80 g. Aluminum silicate (pigment).
64 g. Talcum, micronized.

10 g. Ethylene glycol monoethyl ether.

Component 2

3 g. Methyl ethyl ketoxime

Component 3

2 g. Cobalt octoate (6% Co by weight)
2 g. Lead octoate (24% Pb by weight)
52 g. Ethylene glycol monoethyl ether
40 g. Ethylene glycol monobutyl ether Component 4

135 g. deionized water

The pigment paste (component 1) was dispersed on a three roll mill. 3 g. of one of the anti-settling agents shown below was stirred into the dispersion thus obtained. Then components 2 to 4 were successively added. By dilution with 500 g. of deionized water a suspension having a discharge viscosity according to DIN 53 211 of about 30 seconds at 20° C. was obtained. The procedure was repeated to provide eight sample dispersions.

Into sample dispersions A to G the following substances were incorporated as anti-settling agents:
A. Amine salt I (as the solution).
B. Magnesium-triethanolamine mixed salt of a $C_6$ to $C_{18}$-fatty alcohol sulfate in the form of a 50% by weight solution in cyclohexanol/water.
C. Sodium-triethanolamine mixed salts of mono-coconut-aminosulfosuccinic acid in the form of a 50% by weight solution in butanol/water.
D. Neutral salt from coconut-amine and dimerized fatty acid; 50% by weight solution in higher aromatics.
E. Magnesium-montmorillonite; 3% by weight suspension in water.
F. Organophilic montmorillonite containing about 35% by weight of organic matter; suspension of 10% by weight of montmorillonite, 10% by weight of ethanol and 80% by weight of xylene.
G. Dimethylethanolamine salt of butylphosphoric acid; 50% by weight solution in ethylene glycol monobutyl ether/xylene.

Sample (H) was the control, and to this no anti-settling agent was added.

The samples were stored for 60 days, and were inspected after 1, 7, 14, 30 and 60 days for formation of bottom deposits. The deposits formed were tested with a spatula and the samples were rated as follows:
0 = No deposit.
1 = Little deposit, easily stirrable.
2 = Moderate deposit, stirrable.
3 = Strong deposit, difficulty stirrable.
4 = Very strong deposit, cemented, no longer stirrable.

Results were as follows:

TABLE 2

| Sample | Deposit after days | | | | | |
|---|---|---|---|---|---|---|
| | 1 | 3 | 7 | 14 | 30 | 60 |
| A | 0 | 0 | 0 | 0 | 0 | 0 |
| B | 1 | 3 | 4 | — | — | — |
| C | 2 | 3 | 4 | — | — | — |
| D | 0 | 0 | 1 | 3 | 4 | — |
| E | 0 | 1 | 2 | 3 | 4 | — |
| F | 0 | 0 | 1 | 2 | 4 | — |
| G | 0 | 0 | 1 | 2 | 4 | — |
| H(Control) | 2 | 3 | 4 | — | — | — |

Sample A illustrates the present invention.

EXAMPLE 2

An air-drying, water-dilutable lacquer of the following composition was prepared:

Component 1

260 g. Neutralizable alkyd resin with about 48% by weight drying fatty acids; 75% by weight solution in ethylene glycol monobutyl ether (commercially available under the name "Resydrol VW 38 L" from Hoechst A.G.).
28 g. Triethylamine.
240 g. Titanium dioxide (rutile).
120 g. Calcite.
120 g. Barite.
2 g. Calcium octoate (4% Ca by weight).
1 g. Methyl ethyl ketoxime.
9 g. Ethylene glycol monobutyl ether.

Component 2

115 g. Ethylene glycol monobutyl ether.
8 g. Cobalt octoate (6% Co by weight).
2 g. Zirconium octoate (6% Zr by weight).

Component 3

95 g. Deionized water

The constituents of component 1 were milled on a three roll mill to a pigment paste. 6 g. of the above-described of amine salt II (as the aqueous solution) was stirred into the paste as an anti-settling agent by means of a stirrer. After this, components 2 and 3 were added with stirring. The discharge viscosity according to DIN 53 211 of the finished water lacquer was about 60 seconds at 20° C.

The lacquer was stored for three months, at which time no deposit was formed. A lacquer of the same composition, but without addition of anti-settling agent, after 10 days showed a hard, sedimented, difficulty-stirrable deposit.

EXAMPLE 3

Five samples of a water-dilutable acrylic resin lacquer of the following composition were prepared:

Component 1

235 g. Neutralizable acrylic resin, cross-linking with amine resin 70% solution in alcohols and glycol ethers (commercially available under the name "Resydrol VWY" from Hoechst A.G.).
18 g. Dimethylethanolamine.
3 g. Calcium octoate (4% Ca by weight).
140 g. Titanium dioxide (rutile).
100 g. Calcite.
55 g. Dolomite, micronized.
20 g. Barium chromate.
1 g. Soot.

Component 2

70 g. Hexamethoxymethylmelamine resin, not plasticized, 100%.
45 g. n-Butanol.
45 g. Diethylene glycol monobutyl ether.
88 g. Ethylene glycol monobutyl ether.

Component 3

180 g. Deionized water.

The constituents of the pigment paste (component 1) were mixed together on a three roll mill, and then 2 g.

of active substance of one of the anti-settling agents shown below was stirred into the resulting dispersion. Then the components 2 and 3 were added with stirring. The discharge viscosity according to DIN 53 211 was about 35 seconds at 20° C.

The following substances were incorporated as anti-settling agents in Samples J to N:
J. Amine salt I.
K. Amine salt II.
L. Amine salt III.
M. Soya oil lecithin.
N. No anti-settling agent (control).

The samples were stored for 60 days. After 1, 3, 7, 14, 30 and 60 days each was inspected to see whether a deposit had formed. Any deposit present was tested with a spatula and the samples were rated as in Example 1.

TABLE 3

| Sample | Deposit after days | | | | | |
|---|---|---|---|---|---|---|
| | 1 | 3 | 7 | 14 | 30 | 60 |
| J | 0 | 0 | 0 | 0 | 0 | 0 |
| K | 0 | 0 | 0 | 0 | 0 | 0 |
| L | 0 | 0 | 0 | 0 | 0 | 0 |
| M | 1 | 1 | 2 | 4 | — | — |
| N(control) | 0 | 1 | 3 | 4 | — | — |

Various modifications of the process of the invention may be made without departing from the spirit or scope thereof and it should be understood that the invention is to be limited only as defined in the appended claims.

We claim:

1. A water-dispersible amine salt of the reaction product of a substantially neutral ester of a $C_{14-20}$ ethylenically unsaturated fatty alcohol with an $\alpha$, $\beta$-unsaturated-ethylenedicarboxylic acid with about 1/7 to 1/35 of its weight of an $\alpha$, $\beta$-unsaturated ethylenedicarboxylic compound of acidic character, said reaction product being formed by heating said neutral ester and said ethylenedicarboxylic compound at 200° C. to 250° C. for about 1 to 25 hours; said ethylenedicarboxylic acid and said ethylenedicarboxylic compound each containing not more than six carbon atoms.

2. A salt according to claim 1 wherein said neutral ester is the di(soya alcohol) ester of maleic acid.

3. A salt according to claim 1 wherein said neutral ester is the dioctadecanol ester of maleic acid.

4. A salt according to claim 1 wherein said neutral ester contains conjugated double bonds in the alcohol moiety.

5. A salt according to claim 1 wherein said reaction product is the reaction product of said neutral ester with about 1/10 to 1/20 of its weight of said ethylenedicarboxylic compound.

6. A salt according to claim 1 wherein said ethylenedicarboxylic compound is maleic anhydride.

7. A salt according to claim 1 wherein the amine is a tertiary amine.

8. A salt according to claim 7 wherein said tertiary amine is selected from the group consisting of trimethylamine, triethylamine, tripropylamine, triisopropylamine, dimethylethanolamine, ethyldiethanolamine and triethanolamine.

9. A solution of the salt of claim 1 in a normally liquid non-ionic organic solvent, containing less than 5% by weight of water.

10. A method for the preparation of the salt of claim 1, which consists essentially in heating a mixture of a neutral ester of a $C_{14-20}$ ethylenically unsaturated fatty alcohol with an $\alpha$, $\beta$-unsaturated ethylenedicarboxylic acid with a watersoluble $\alpha$, $\beta$-unsaturated ethylenedicarboxylic compound of acidic character at 200° C. to 250° C. until said ester has reacted with between 1/7 and 1/35 of its weight of said compound and neutralizing the product of said reaction with at least a sufficient amount of a water-soluble amine to form a water-dispersible salt.

11. A process according to claim 10 wherein said mixture is substantially anhydrous.

12. A process according to claim 10 wherein said mixture contains substantially no solvent.

13. A process according to claim 10 wherein the product of said reaction and said amine are in organic solution during said reaction, said solution containing less than about 5% of water by weight.

14. A method for the preparation of a water-soluble salt of claim 1 which consists essentially in forming a substantially neutral water-soluble ester by reacting mixtures of mono- and poly-ethylenically unsaturated fatty alcohols of various chain lengths having 14 to 20 carbon atoms and containing some saturated alcohols with an $\alpha$, $\beta$-unsaturated ethylenedicarboxylic compound of acidic character containing not more than six carbon atoms; heating said ester with an $\alpha$, $\beta$-unsaturated ethylenedicarboxylic compound of acidic character containing not more than six carbon atoms until said ester has reacted with between 1/7 and 1/35 of its weight of said compound; and forming the reaction product into a water-dispersible amine salt.

15. An aqueous lacquer comprising a water-soluble film-forming component, a pigment, and an effective amount of an amine salt according to claim 1 as agent inhibiting settling of said pigment.

16. A lacquer according to claim 15 wherein the amount of said amine salt is from 0.01% to 5% by weight, based on the weight of said pigmented aqueous lacquer.

17. A lacquer according to claim 15 wherein the amount of said amine salt is from 0.1% to 3% by weight, based on the weight of said pigmented aqueous lacquer.

18. A lacquer according to claim 15 wherein the pigment is titanium dioxide.

19. A lacquer according to claim 15 wherein the film-forming component is an isocyanate-modified neutralizable alkyd resin.

20. A method of inhibiting the settling of pigment in a pigmented aqueous lacquer, which consists essentially in adding to said lacquer a small but effective amount therefor of a salt according to claim 1.

21. A method according to claim 20 wherein the salt is added to the lacquer as a solution.

22. An amine salt of the reaction product of (i) a substantially neutral ester prepared by reacting mixtures of mono- and poly- ethylenically unsaturated fatty alcohols of various chain lengths having 14 to 20 carbon atoms and containing some saturated alcohols with an $\alpha$, $\beta$-unsaturated ethylenedicarboxylic acid with (ii) about 1/7 to 1/35 of its weight of an $\alpha$, $\beta$-unsaturated ethylenedicarboxylic compound of acidic character, said reaction product being formed by heating said neutral ester and said ethylenedicarboxylic compound at 200° C to 250° C for about 1 to 25 hours; said ethylenedicarboxylic acid and said ethylenedicarboxylic compound each containing not more than six carbon atoms.

23. An amine salt according to claim 22 wherein said unsaturated fatty alcohols are selected from the group consisting of commercial oleyl alcohol, commercial soya alcohols and linseed oil alcohols.

* * * * *